United States Patent [19]

Sano et al.

[11] 4,235,647
[45] Nov. 25, 1980

[54] METHOD FOR MACHINING BY THERMAL SHOCK

[75] Inventors: Toshio Sano, Tokorozawa; Masaharu Takahashi, Tokyo; Masayuki Yokai, Higashi-Yamato, all of Japan

[73] Assignee: Agency of Industrial Science & Technology, Ministry of International Trade & Industry, Tokyo, Japan

[21] Appl. No.: 15,770

[22] Filed: Feb. 28, 1979

[30] Foreign Application Priority Data

Mar. 27, 1978 [JP] Japan .................................. 53/35051

[51] Int. Cl.³ .............................................. B23K 7/00
[52] U.S. Cl. ................................................. 148/9 R
[58] Field of Search ....................................... 148/9 R

[56] References Cited

U.S. PATENT DOCUMENTS

| | | | |
|---|---|---|---|
| 2,541,344 | 2/1951 | Davis | 148/9 |
| 3,359,140 | 12/1967 | Butler | 148/9 |

*Primary Examiner*—Howard S. Williams
*Attorney, Agent, or Firm*—Kurt Kelman

[57] ABSTRACT

A method for the machining of a work blank by thermal shock, comprising the steps of locally heating and fusing the portions of the work blank desired to be machined and subsequently injecting a liquefied gas of extremely low temperature into the fused portions for thereby causing the fused portions to contract by thermal shock and enabling the removal of the fused portions and consequently the machining of the work to be accelerated by the explosive gasifying action of the liquefied gas.

2 Claims, 3 Drawing Figures

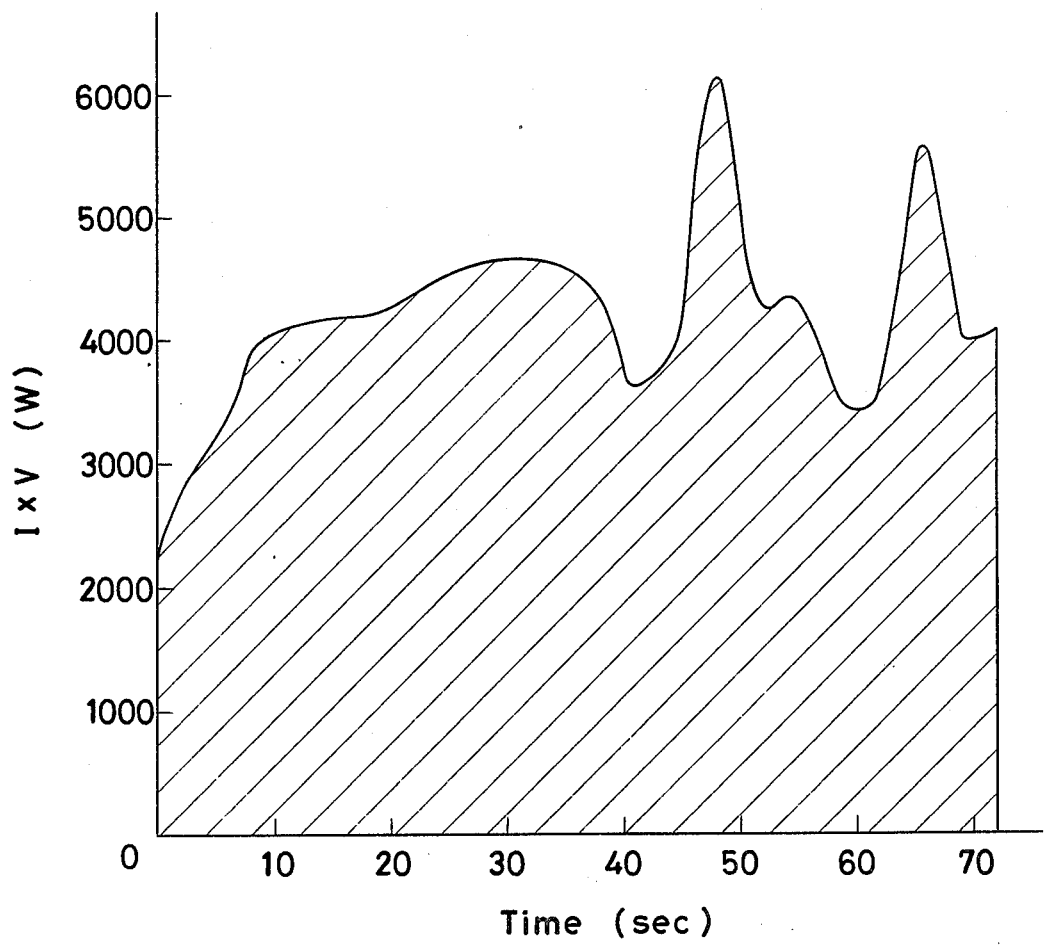
Fig_3

METHOD FOR MACHINING BY THERMAL SHOCK

BACKGROUND OF THE INVENTION

This invention relates to a method for machining by means of thermal shock, which method is suitable particularly for machining work blanks of a material which is not easily machined.

For use in melt cutting, grooving, drilling and otherwise machining work blanks, various heat sources such as, for example, welding flame (acetylene), arc (electric), plasma arc, electron beam and laser are properly selected in conformity with the fusibility of particular materials of such work blanks subjected to machining.

When a metal blank of cast iron is melt-cut by plasma arc, for example, the desired melt-cutting is effected by causing the plasma arc to pass along a precribed cutting line in the work blank. In this case, the removal of the product of fusion by plasma arc is accomplished by use of a forced current of a cutting gas directed toward the part of the work blank being machined.

A method which effects the removal of the fused material by directing a jet of water toward the points of machining in the work blank has also been suggested (U.S. Pat. No. 3,967,090).

When the work blank happens to be a piece with low malleability such as a thick plate of cast iron which permits no flash cutting or drilling, however, effective expulsion of the fused material cannot be obtained by injecting a cutting gas or jet of water. Thus the machining operation inevitably consumes a hugh volume of energy and much time.

An object of this invention is to provide a method for economically and rapidly machining work blanks made of materials having particularly low malleability by means of thermal shock.

SUMMARY OF THE INVENTION

To accomplish the object described above according to the present invention, there is provided a method for machining by thermal shock, which comprises locally heating and fusing portions of a work blank desired to be machined and, after the portions have been converted into a fused state, injecting a liquefied gas of extremely low temperature into the portions now filled with fused material for thereby causing the fused portions to contract by thermal shock and enabling the removal of the fused portions and consequently the machining of the work to be accelerated by the explosive gasifying action of the liquefied gas and, after the fused portions have been removed, locally heating and fusing the newly exposed portions of the work blank and thereafter again injecting the liquefied gas into the fused portions. The series of the steps of local fusion and removal of fused portions described above is repeated until the desired degree of machining is completed on the work blank.

Since the present invention effects desired machining on a given work blank by injecting onto the portions to be machined a proper amount of a liquefied gas having a small heat capacity and low latent heat and subsequently removing the fused portions, it proves to be most suitable for machining work blanks of highly immaleable materials such as cast iron or for machining scraps of automobiles, shipborne and other machines. Moreover, the drilling of holes in thick plates of cast iron which has heretofore proved to be very difficult can be accomplished with relative ease by the method of this invention.

The other objects and characteristic features of this invention will become apparent from the detailed description given hereinafter with reference to the accompanying drawing.

BRIEF EXPLANATION OF THE DRAWING

FIG. 3 is a graph showing the relation between the energy consumed and the time required by the conventional machining method.

DESCRIPTION OF THE PREFERRED EMBODIMENT

Through studies and experiments, the inventors ascertained that in melt-cutting a work blank, the energy consumed and the time required for the machining operation are notably decreased by carrying out the operation with the fused material at the portions being machined being removed as soon as it is formed. For the removal of such fused material, it has been proposed to make effective use of the cutting gas or to utilize a jet of water in the case of the arc cutting operation.

These methods are actually very effective when the machining work consists of cutting completely through the work blank. When the machining operation is performed on a work blank of an immaleable material or when the machining operation occurs in only a part of the work blank, however, the removal of the fused material is difficult to carry out.

This invention has been developed in due consideration of this fact.

The machining method of this invention which utilizes thermal shock comprises locally heating and fusing by means of a suitable heat source the portions of a work blank desired to be machined and, after the portions have been converted into a fused state, discontinuing the supply of thermal energy and injecting into the fused portions a liquefied gas of extremely low temperature. In consequence of the injection of the liquefied gas, the fused portions are suddenly cooled and are caused to contract because of the resultant phenomenon of thermal shock. In the meantime, the liquefied gas is explosively gasified because of the abrupt change of temperature. The contraction of the fused portions by the thermal shock and the explosive force generated in consequence of the gasification of the liquefied gas combined to accelerate desired machining of the portions being removed and, at the same time, the aforementioned explosive force generated by the gasification blows the fused portions out of position to expose deeper portions yet to be removed. When the thermal energy is supplied again from the heat source to the deeper, newly exposed portions, it is allowed to come into direct contact with the aforementioned deeper portions and consequently cause very effective fusion of these deeper portions. The machining proceeds quite advantageously when the series of the steps of fusion by heating and removal of the product of fusion is repeated until the portions to be removed reach the prescribed depth. By this method, the energy consumed and the time required for the machining operation can be notably decreased.

Now, an embodiment of the machining method of this invention by thermal shock will be described with reference to FIG. 1.

Figure 1:
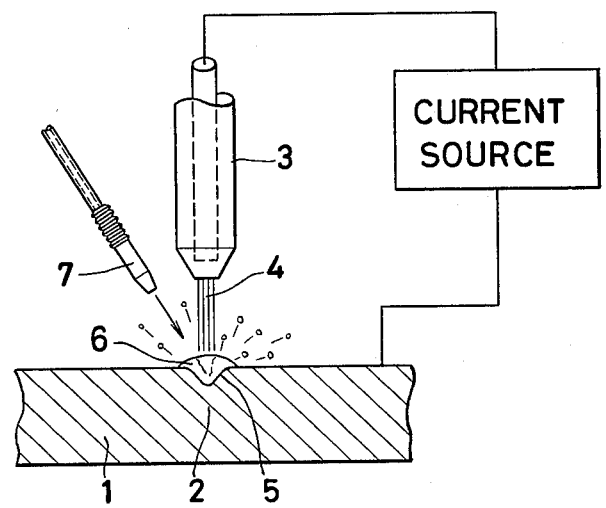
FIG. 1 is an explanatory diagram of an apparatus to be used for working the present invention.

The embodiment illustrated in FIG. 1 represents an operation of melt-cutting a work blank by virtue of a plasma arc. A portion 2 at which a given work blank 1 is desired to be melt-cut is fused by causing a plasma arc 4 to be formed between the aforementioned portion 2 and a nozzle 3 of the arc cutting apparatus. Although the heating of the portion 2 is illustrated as being effected by use of a plasma arc by way of example, heat sources of higher energy densities including other arcs, gases, electron beam and laser may be suitably used to meet the particular purpose. By this heating, the portion 2 fuses inwardly from the upper surface and the immediately underlying surface 5 yet to be cut is consequently covered with fused material 6. After the portion 2 has been fused and the underlying surface covered with the fused material 6, the flow of electric current to the plasma torch is discontinued and the plasma torch is moved away as necessary. Immediately, a liquefied gas of extremely low temperature such as, for example, liquefied nitrogen or liquefied helium is injected into the fused portion under a fixed pressure from a liquefied gas nozzle 7. For the purpose of this injection, use of a liquefied gas of the kind which has low temperature and possesses a small heat capacity and low latent heat proves to be effective. Liquefied nitrogen is found to be most useful for the purpose.

Such a liquefied gas is transferred from its cylinder (not shown) to the liquefied gas injection nozzle 7 of stainless steel through a two-wall tube made of a metallic material such as stainless steel and enclosing a vacuum between the walls, so that the liquefied gas will be kept from being gasified in transit. Through the injection nozzle 7, the liquefied gas is injected into the fused portion of the work blank. The amount of the liquefied gas thus injected into the fused portion is determined by the pressure of the liquefied gas, the diameter of the orifices of the nozzle, the number of orifices in the nozzle, the duration of the injection, etc. When the amount of the liquefied gas thus injected is too large, the fused material is scattered about violently to adhere to the cutting apparatus or the liquefied gas injection nozzle and adhere to the surface of machining so much as to impair the stable generation of plasma arc in the subsequent round of heating for fusion. It also results in excessive cooling of the portion so much as to reduce the economy of the machining operation.

When the amount of the liquefied gas thus injected is too small, the fused material cannot be removed thoroughly from the underlying surface.

The fusion by heating of the portion to be removed from the work blank and the injection of the liquefied gas onto the fused material are performed alternately to preclude otherwise possible adhesion of the fused material to the nozzle and other items. When a laser beam is used as the heat source for the fusion, for example, the laser generator and the work blank are separated by a fairly large distance from each other and the variation in this distance has no effect upon the thermal energy involved. Thus, the fusion by heating and the injection of the liquefied gas into the fused material can be carried out at the same time. Where a thick round bar is melt-cut by having the bar slowly turned round its axis held at a fixed distance from a stationary cutting arc, the liquefied gas may be continuously injected into the fused material as it is formed.

By the injection onto the fused portion of a proper amount of the liquefied gas of extremely low temperature, the fused portion is abruptly cooled and caused to contract because of the resultant phenomenon of thermal shock. At the same time, the liquefied gas which has been injected into the fused portion is explosively gasified. The contraction of the fused portion by the thermal shock and the explosive force generated in consequence of the gasification of the liquefied gas are combined to blow the fused material away and accelerate the required machining. Even when machining such as cutting or drilling has not been effected completely, the fused material can easily be removed from the portion being melted.

This phenomenon of the explosive scattering of the fused material terminates substantially in a few seconds following the injection of the liquefied gas. Immediately, the newly exposed underlying surface is melted by injecting the cutting gas through the torch of the arc cutting apparatus and establishing the electric current between the electrode and the work blank to form a plasma arc at the portion.

As described above, the present invention permits desired melt-cutting of a work blank to proceed at the same time that the fused material is removed. Thus, the present invention is ideally used for the cutting of scrapped vehicles, shipborne machines and other machines which demand economy and rapidity most of all. When the amount of the liquefied gas to be injected into the fused material is correctly adjusted be effective use of a proper heat source, the machining method of the present invention will be even capable of drilling a thin hole accurately in a thick cast iron plate which has heretofore defied effective drilling.

Now the present invention will be described more specifically herein below with reference to preferred embodiments. It should be noted that the present invention is not limited to those examples.

EXAMPLE 1

A round bar of ferric cast iron (containing 4.31% of carbon, 2.29% of silicon, 0.60% of manganese, 0.08% of lead and 0.03% of sulfur) having a diameter of 30 mm was melt cut with a plasma arc by rotating the bar at a rate of 1 rpm around its axis held at a fixed distance from the plasma arc. The flow rate of the pilot gas (Ar) was fixed at about 0.8 lit/min and that of the cutting gas ($Ar + H_2$) at about 18 lit/min respectively.

First, the pilot gas and the cutting gas were projected and the flow of electric current was established between the electrode and the round bar to generate a plasma arc and start the melt cutting of the round bar. In 12 seconds following the start of the electric current, the portion being cut was converted into a fused state. At this point, the flow of the electric current was discontinued and liquefied nitrogen was immediately injected into the fused portion via an injection nozzle having an orifice 1.0 mm in diameter. Consequently, an explosion took place and the fused material was scattered away. The pressure of the liquefied nitrogen thus injected was about 3 atmospheres.

The supply of the liquefied nitrogen to the injection nozzle was effected by connecting one end of a two-wall tube of stainless steel having a length of 1.5 m and enclosing a vacuum between the walls to the cylinder for storage of liquefied nitrogen and the other end of the two-wall tube to the injection nozzle via a metallic bellows 0.5 m in length.

Figure 2:
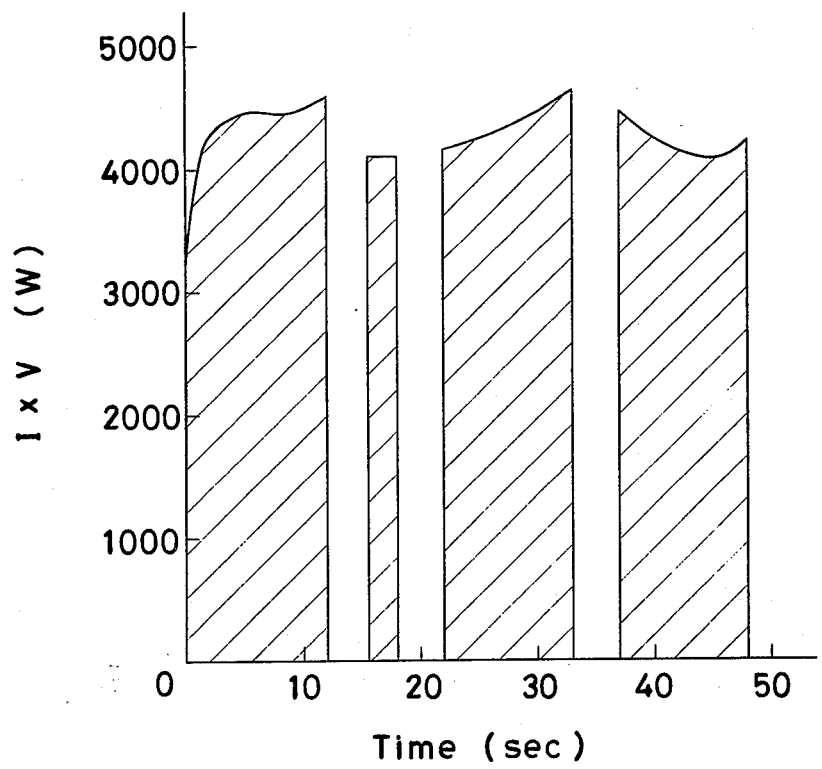
FIG. 2 is a graph showing the relation between the energy consumed and the time required by one embodiment of the machining method of this invention making use of thermal shock.

After the liquefied nitrogen had been injected for 3.5 seconds, the plasma arc was again generated in the manner described above to effect the cutting for 2.5 seconds. Subsequently, the injection of the liquefied nitrogen was continued for four seconds, the plasma arc cutting for 11 seconds, the injection of the liquefied nitrogen for four seconds and the plasma arc cutting for 11 seconds. Consequently, the cutting of the round bar was completed. The total energy consumed for this cutting operation was about 36.87 Kcal as shown in the graph of FIG. 2 and the time required for the operation was about 48 seconds.

For the purpose of comparison, the same round bar was continuously cut with the same plasma arc under the same conditions as described above, except that the injection of the liquefied nitrogen was omitted. The energy consumed in this cutting operation was as shown in FIG. 3. From the graph, it is seen that the energy consumed was about 65.28 Kcal and the time required was about 72 seconds. Comparison clearly shows that the energy consumed and the time required by the conventional method involving no injection of any liquefied gas were decreased by about 44% and about one third respectively by the machining method of this invention.

EXAMPLE 2

A carbon steel plate (containing 0.35% of carbon, 0.23% of silicon, 0.85% of manganese, 0.25% of lead and 0.25% of sulfur) 380 mm in length, 35 mm in width and 17 mm in thickness was set in position and a plasma arc was generated under the same condition as those involved in Example 1 to drill a hole in the plate.

The liquefied gas was injected into the fused material by using the same apparatus as described in Example 1. This apparatus was provided with a timer which was set so that the generation of the plasma arc was continued for 15 seconds and, after the plasma arc generation was stopped, the injection of the liquefied gas was continued for 2 seconds and this alternate generation of the plasma arc and injection of the liquefied gas was repeated thereafter. During the seventh generation of plasma arc, a hole about 15 mm in diameter was opened through the plate.

What is claimed is:

1. A method of machining a work blank, which comprises the steps of locally heating and fusing a portion of the work blank, injecting into the fused portion of the work blank a liquefied gas of extremely low temperature, small heat capacity and low latent heat to subject the fused portion of the work blank to thermal shock as soon as it is formed and to scatter said fused portion away to remove said portion and expose an underlying portion of the work blank, and repeating the fusing of successive ones of the underlying portions and injecting of the liquefied gas into each one of the underlying portions until a desired depth in the work blank has been removed.

2. The machining method of claim 1, wherein the liquefied gas is nitrogen.

* * * * *